April 7, 1970   J. S. RENÉ   3,504,708
INVERTED ARCH PIPE
Filed May 11, 1967
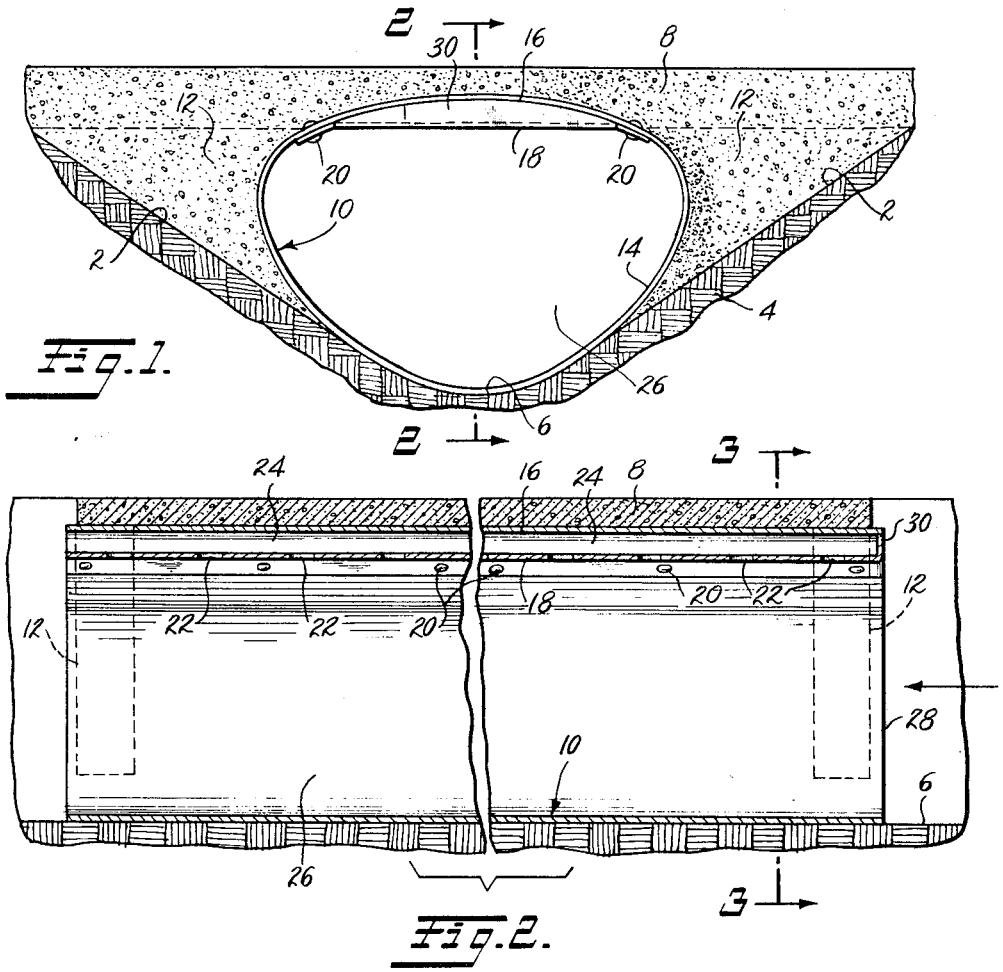
Fig.1.
Fig.2.
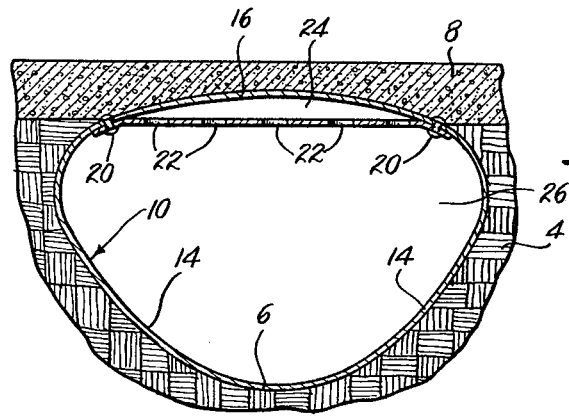
Fig.3.
INVENTOR.
J. STANLEY RENÉ
BY
Bacon & Thomas
ATTORNEYS

United States Patent Office

3,504,708
Patented Apr. 7, 1970

3,504,708
INVERTED ARCH PIPE
J. Stanley René, 1210 Parkway Court,
Lafayette, Ind. 47905
Filed May 11, 1967, Ser. No. 637,682
Int. Cl. F16l 1/00, 9/18
U.S. Cl. 138—105                                    1 Claim

ABSTRACT OF THE DISCLOSURE

A culvert pipe shaped to define a lower flow channel portion of generally rounded V-shape and an upper somewhat flat arch portion with a horizontal and perforated tie plate joining the ends of the arch. The tie plate divides the interior of the conduit into a lower flow channel and an upper air vent compartment closed at one end, the volume of the vent compartment comprising only a minor portion of the total volume in the conduit.

BACKGROUND OF THE INVENTION

This invention relates to pipe and particularly conduit pipe for use as culverts or the like under roadways.

It is often necessary to provide a culvert under a roadway to continue a drainage channel or ditch thereunder. The most common form of culvert pipe is a simple cylinder providing communication between the portions of the ditch on each side of the roadway. Most drainage ditches are dug with a relatively narrow flat bottom and upwardly and outwardly sloping side walls. The cross-section of such ditches is therefore trapezoidal or in some cases, practically V-shaped. As is known, the center of flow of such a ditch is at the center of gravity of the cross-section of the water therein and such center of flow rises as the water rises in the ditch. To effect smooth flow transition from a ditch into a culvert conduit, it is necessary that the center of flow of the conduit be as nearly as possible at the same height as the center of flow in the ditch. However, a conventional cylindrical pipe does not provide these conditions since water depth greater than the radius of the pipe will result in a vertical displacement between the center of flow in the ditch and that in the pipe, resulting in excessive turbulence at the entrance to the pipe and a diminishing of the capacity through the culvert. Obviously, when the height of the water is sufficient to completely fill the entrance to the culvert, there is an excessive difference in the heights of the centers of flow and excessive turbulence takes place. Furthermore, under such conditions air enters the conduit along with the water and further restricts the available flow channel in the conduit and thus further reduces the capacity thereof.

A further disadvantage in cylindrical conduits is that under excessive, vertical, external loads they collapse rather readily. This later disadvantage has been sought to be corrected heretofore by forming such conduit pipes, not of cylindrical pipe, but of generally inverted V-shape having a nearly flat bottom. Such conduits have been used wherein the inverted V-shape was somewhat rounded, particularly at the corners, but which provided a nearly flat bottom. Obviously, such pipes will not effect a smooth transition of flow from the ditch to the conduit for the reasons set forth above. For example, such prior designs are the patents to Potter 987,398, Miller et al. 2,202,743, Claybaugh 2,286,197 and Feder 3,279,500.

SUMMARY OF THE INVENTION

This invention overcomes the aforementioned difficulties and disadvantages of prior conduit pipes. The pipe of this invention is of generally rounded V-shape but with the narrow portion at the bottom and the side walls diverging upwardly and outwardly. Across the top of the conduit is a relatively flat but arched plate portion joined to the upper edges of the diverging side walls and a horizontal tie plate extends across the upper portion of the pipe and securely joins the ends of the arch where they meet the side walls. The tie plate preferably extends the full length of the conduit and is perforated to divide the interior of the conduit into a lower flow channel comprising the major portion of the pipe and an upper vent compartment communicating with the flow channel through the perforations in the plate. The entrance into the conduit includes a closure on that end of the vent compartment to exclude floating debris whereby the vent compartment is kept open at all times. Such a conduit provides for smooth transition of flow from the ditch to the culvert and at the same time provides high strength, resisting vertical loads imposed upon the pipe.

BRIEF DESCRIPTION OF THE DRAWINGS

FIG. 1 is a vertical sectional view through a drainage ditch looking toward the entrance end of a culvert conduit of the present invention;

FIG. 2 is a longitudinal vertical sectional view taken substantially along the line 2—2 of FIG. 1; and FIG. 3 is a transverse sectional view taken substantially on the line 3—3 of FIG. 2.

DESCRIPTION OF THE PREFERRED EMBODIMENT

In the drawings, numerals 2 indicate the side walls of a drainage ditch dug in soil or the like 4. The ditch is provided with a bottom 6 which may be flat and of greater width than shown in the drawings but FIG. 1 is representative of the sectional shape of the usual ditch that has been in use for sometime. Numeral 8 indicates a roadway extending over the drainage ditch and over a culvert pipe 10. As shown in the drawings, a concrete head wall 12 is provided at each side of the roadway 8 to prevent washing of soil or fill material placed around the culvert pipe 10.

The lower portion of the culvert pipe is of generally V-shape with upwardly diverging side walls 14, although it is to be noted that there are no sharp corners, the designation as being of generally V-shape merely being for convenience. However, it is important that the side walls 14 diverge upwardly and outwardly generally as shown. The top of the pipe 10 is defined by a relatively flat arched portion 16 joined to the upper edges of the side walls 14. As shown, the arch 16 and side walls 14 are different portions of a single integral metal plate. The conduit may be made from a smooth sheet of metal, as shown, or may be of corrugated metal formed with the corrugations therein extending circumferentially, as is common in conduit pipes.

A horizontal tie plate 18 is positioned within the conduit 10 and extends horizontally thereacross in chordal relation to the flat arch 16. The plate 18 extends the full length of the pipe 10 and at its edges is secured, as by means of rivets 20 or the like, to the juncture between the arch 16 and the side walls 14. The tie plate 18 thus serves as a strengthening element since vertical loads imposed on the arch 16 result in extremely high lateral forces tending to spread the side walls 14. The tie plate 18 prevents such spreading and results in transmission of the loading generally downwardly on the upper edges of the side walls to thus increase the strength of the conduit and its load bearing ability.

As is clearly shown in FIG. 2, the tie plate 18 is provided with a multiplicity of openings 22 therethrough. Those openings not only reduce the weight of the conduit but provide communication between the vent chamber 24 defined between the arch 16 and the plate 18 and the flow channel 26 defined by the lower portion of the conduit. As clearly evident from the drawings, the flow channel 26 constitutes the major portion of the area of the conduit whereas vent chamber 24 is only a minor portion thereof. At the entrance end 28 of the conduit 10, the tie plate 18 is turned upwardly to define a closure 30 for the compartment 24 at only the entrance end of the conduit.

As is apparent from the drawings, the side walls 2 of the drainage ditch are substantially tangent to portions of the side walls 14 of the conduit 10 since normally the conduit is merely laid in the ditch and the fill material and head walls 12 put in place. It is also apparent that the center of gravity of the flow channel 26 will be generally at the same height as the center of gravity of the drainage ditch itself and thus a smooth transition from the ditch into the culvert is provided without excessive turbulence and with the water flowing as nearly in a non-deviating line as is possible. On occasions when the water level in the ditch approaches the top of the flow channel, the closure 30 will prevent entrance of any debris into the vent compartment 24. Water flowing through the conduit 10 may rise right up to the level of the tie plate 18 and any air carried into the culvert with the water or debris being carried thereby will be vented through the openings 22 into the compartment 24 and out of the downstream end thereof, thus removing all air from the flow channel and permitting the water to flow smoothly therethrough without turbulence, which would be caused by air trapped within a conventional peripherally closed conduit.

In actual tests, three pipes were constructed of equal cross-sectional area and of the same material, one was formed in the manner described herein with reference to the drawings, one was of circular cross-section without any internal tie plate and the third was of the generally flat bottom-inverted V-shape referred to previously as being in common use today. Ditches were constructed leading water to the three pipes, all ditches being made of equal area, length, and slope. The ditches were filled and fed from an equalizing channel which maintained a uniform head of water in all three ditches. After measuring the flow through the respective pipes for some thirty different tests, the inverted arch pipe of the present invention always carried at least 5% more water than the flat bottom pipe and 30% more water than the round pipe. In addition, a series of load tests showed that the flat bottom pipe sustained only 90% as much load as the round pipe while the inverted arch pipe of the present invention would carry 130% as much load as the round pipe. The measured loading was based on crushing of the pipe and deflection under direct loading with no fill material around it.

While a single specific embodiment of the invention has been shown and described herein, it is to be understood that the same is merely exemplary of the principles of the invention and that other specific shapes may be resorted to within the scope of the invention.

I claim:

1. A culvert pipe having open ends, comprising; a lower portion of generally rounded V-shape, defining a flow channel having upwardly and outwardly diverging side walls; and upper portion comprising a generally horizontal but slightly upwardly arched wall laterally spanning the top of said flow channel and joined at its edges to the upper edges of said diverging side walls to define therewith a peripherally closed conduit; a tie plate extending chordally across the interior of said conduit from end to end thereof between the regions of the junctures between said upper and lower portions and being secured thereto to define a tension member and defining a lower flow channel and an upper venting compartment, and to prevent lateral spreading of said side walls under external vertical loads applied to said conduit, the maximum spacing between said tie plate and said upwardly arched wall being only a minor fraction of the height of said flow channel which comprises nearly all of the interior of said pipe; a multiplicity of openings through said plate to provide air vents between said flow channel and said compartment; and means closing one end of said compartment, the other thereof being open.

References Cited

UNITED STATES PATENTS

| | | | |
|---|---|---|---|
| 1,031,766 | 7/1912 | Yost | 138—115 |
| 1,048,153 | 12/1912 | Haight | 61—16 |
| 1,289,001 | 12/1918 | Robinson | 138—116 |
| 987,398 | 3/1911 | Potter | 138—115 |
| 2,067,078 | 1/1937 | Faber | 138—115 |
| 3,279,500 | 10/1966 | Feder | 138—110 |

FOREIGN PATENTS

| | | |
|---|---|---|
| 1,461 | 1880 | Great Britain. |
| 122,622 | 1918 | Great Britain. |
| 278,259 | 1930 | Italy. |
| 285,288 | 1931 | Italy. |

OTHER REFERENCES

California Culvert Practice, State of California, Department of Public Works, Division of Highways, Sacramento, Calif., (1944), p. 32.

MERVIN STEIN, Primary Examiner

U.S. Cl. X.R.

138—116